United States Patent [19]
Zörner

[11] Patent Number: 6,037,581
[45] Date of Patent: Mar. 14, 2000

[54] DEVICE FOR RECORDING A CHANGE IN POSITION AT A TURBINE CONFIGURATION

[75] Inventor: Walter Zörner, Baiersdorf, Germany

[73] Assignee: Siemens Aktiengesellschaft, Munich, Germany

[21] Appl. No.: 09/115,881

[22] Filed: Jul. 15, 1998

Related U.S. Application Data

[63] Continuation of application No. PCT/DE97/00015, Jan. 8, 1997.

[51] Int. Cl.$^7$ .................................. G01J 1/04; G01D 5/34
[52] U.S. Cl. ................................ 250/231.13; 250/227.11; 250/559.14; 73/660
[58] Field of Search ......................... 250/231.13, 231.18, 250/231.14, 227.11, 559.16, 559.14, 227.24; 73/655, 660, 661

[56] References Cited

U.S. PATENT DOCUMENTS

| | | |
|---|---|---|
| 3,327,584 | 6/1967 | Kissinger . |
| 4,049,644 | 9/1977 | Wennerstrom . |
| 4,701,053 | 10/1987 | Ikenaga . |
| 4,701,610 | 10/1987 | Hoogenboom . |
| 5,557,099 | 9/1996 | Zielinski et al. .................... 250/227.11 |

FOREIGN PATENT DOCUMENTS

| | | |
|---|---|---|
| 0 353 076 A2 | 1/1990 | European Pat. Off. . |
| 27 30 508 | 1/1979 | Germany . |
| 1080726 | 8/1967 | United Kingdom . |

OTHER PUBLICATIONS

International Publication No. WO 93/17296 (Sweeney et al.) , dated Sep. 2, 1993.
"High Temperature Alloys for Gas Turbines", Proceeedings of a Conference, Oct. 4–6, 1982;
"Fiber–Optic Lateral–Displacement Sensor", 2301 N.T.I.S. Tech Notes, Feb. 1988.

*Primary Examiner*—Edward P. Westin
*Assistant Examiner*—Kevin Pyo
*Attorney, Agent, or Firm*—Herbert L. Lerner; Laurence A. Greenberg

[57] ABSTRACT

A turbine configuration includes a turbine shaft having a surface, and/or turbine blades fastened to the turbine shaft and having surfaces, and a turbine casing surrounding the turbine blades. When the turbine is in operation, a radial gap occurring between the turbine casing and the turbine shaft or between the turbine casing and a turbine blade is monitored. A device for recording a change in position at the turbine configuration includes a glass fiber probe led through the turbine casing, a measurement reference point applied to the surface of at least one turbine blade and/or to the surface of the turbine shaft and formed of nonoxidizing material, for reflecting light from the glass fiber probe, a device for recording differences in intensity in the reflected light, and a device for comparing a difference in intensity with a reference value determined at a previous time.

12 Claims, 2 Drawing Sheets

DEVICE FOR RECORDING A CHANGE IN POSITION AT A TURBINE CONFIGURATION

CROSS-REFERENCE TO RELATED APPLICATION

This application is a continuation of copending International Application Number PCT/DE97/00015, filed Jan. 8, 1997, which designated the United States.

BACKGROUND OF THE INVENTION

FIELD OF THE INVENTION

The invention relates to a device for recording a change in position at a turbine configuration having a turbine shaft and/or turbine blades fastened to the turbine shaft and surrounded by a turbine casing.

When a turbine, for example a steam turbine, is in operation, operational stress on a rotor having the turbine shaft and the turbine blades (moving blades), may cause changes in radial clearances or bridging of radial gaps, predominantly in a region where the rotor experiences the greatest sag. Such gap changes, which occur particularly at high temperatures, are therefore normally monitored.

In order to monitor gaps between turbine parts, it is known from International Publication Number WO 93/17296, corresponding to U.S. Pat. No. 5,572,039, to detect gap changes, on the basis of changes in light intensity, through the use of an optical waveguide led through the turbine casing and through the use of prisms disposed in the turbine casing and/or in a turbine blade. However, a disadvantage thereof is that thermal influences and the moisture of the working medium, for example steam, present in the gap, result in fogging of the prisms and the formation of scale on turbine parts. Such scaling or coatings on the turbine parts causes the intensity of the reflected light to change, irrespective of gap changes. Accurate and constant measurement of the radial gap is therefore not ensured. Furthermore, gap monitoring has heretofore not been provided in an edge region of the rotor.

SUMMARY OF THE INVENTION

It is accordingly an object of the invention to provide a device for recording a change in position at a turbine configuration, which overcomes the hereinafore-mentioned disadvantages of the heretofore-known devices of this general type and with which reliable and accurate radial gap monitoring becomes possible, even when scale forms on turbine parts.

With the foregoing and other objects in view there is provided, in accordance with the invention, in a turbine configuration including a turbine shaft having a surface, and/or turbine blades fastened to the turbine shaft and having surfaces, and a turbine casing surrounding the turbine blades, a device for recording a change in position at the turbine configuration, comprising a glass fiber probe led through the turbine casing; a measurement reference point applied to the surface of at least one turbine blade and/or the surface of the turbine shaft and formed of nonoxidizing material, for reflecting light from the glass fiber probe; a device for recording differences in intensity in the reflected light; and a device for comparing a difference in intensity with a reference value determined at a previous time.

While the measurement reference point is disposed on the turbine blade in order to measure the radial gap between the turbine blade and the turbine casing, the measurement reference point is applied to the shaft surface in order to measure the radial gap occurring between the turbine shaft and the turbine casing.

In accordance with another feature of the invention, the nonoxidizing material of the measurement reference point is formed of a scale-resistant material, for example of chrome nickel, of platinum or of gold. This is done in order to achieve as constant and as reliable a measurement reference point as possible for monitoring the radial gap when a turbine is in operation.

In accordance with a further feature of the invention, the glass fiber probe is composed of a glass fiber bundle.

In accordance with an added feature of the invention, the glass fiber probe can be inserted releasably into the turbine casing, for example using a thread at the measuring point, in order to ensure that the glass fiber probe can be exchanged without uncovering the turbine.

In accordance with an additional feature of the invention, the glass fiber probe is inserted into a ceramic-insulated tube, so as to be resistant to high temperature. This is done in order to ensure that the radial gap can also be determined in the region of high temperatures, in particular in the high pressure part of a steam turbine.

When a turbine, in particular a two-shell turbine, is in operation, changes in the diameter of an inner and/or outer casing often occur. In accordance with yet another feature of the invention, in order to compensate for changes of this kind, the glass fiber probe is led through an elastic jacket in a region between the two turbine casing parts. The glass fiber probe is thus advantageously constructed to be flexible and resistant to expansion.

In accordance with yet a further feature of the invention, in order to ensure that a shaft displacement can be detected as soon and as accurately as possible, at least one measurement reference point being formed of nonoxidizing material is applied to the shaft surface in the region of a labyrinth seal provided between the turbine shaft and the turbine casing.

In accordance with yet an added feature of the invention, in this case, a displacement of the turbine shaft in relation to the turbine casing is determined by providing a plurality of glass fiber probes and a corresponding number of measurement reference points on the shaft surface and/or on the turbine blades.

In accordance with yet an additional feature of the invention, the glass fiber probe is connected to a light wave transmitter and receiver (transceiver). Changes in the radial gap are thereby determined on the basis of changes in the light conditions at the measuring location.

In accordance with a concomitant feature of the invention, there is provided an evaluation and diagnostic system for determining and representing the radial gap profile and the shaft displacement.

The advantages achieved through the use of the invention are, in particular, that constant and accurate evaluation and an exact diagnosis of radial gaps and/or shaft displacements are ensured by the use of nonoxidizing measurement reference points. Damage and material wear on the turbine blades can thus be detected at an early stage. In particular, actions in which rotating turbine parts brush against stationary turbine parts resulting energy losses, are avoided.

Other features which are considered as characteristic for the invention are set forth in the appended claims.

Although the invention is illustrated and described herein as embodied in a device for recording a change in position at a turbine configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
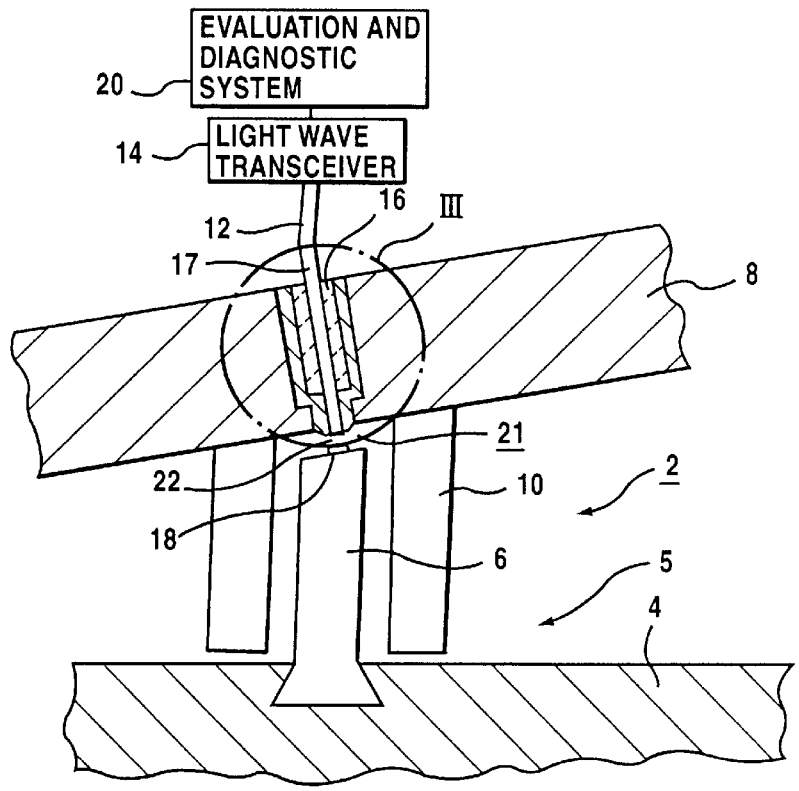
FIGS. 1 and 2 are fragmentary, diagrammatic, sectional views of a turbine with a device for radial gap monitoring.

Referring now in detail to the figures of the drawings, in which parts corresponding to one another are given the same reference symbols, and first, particularly, to FIG. 1 thereof, there is seen a turbine 2 which is, for example, a steam turbine. The turbine 2 includes a turbine shaft 4 with moving blades 6 which are fastened to the latter and which are surrounded by a turbine casing 8 having guide blades 10 fastened thereto.

A device for radial gap monitoring includes a glass fiber probe 12 which is led through the turbine casing 8 and to which a light wave transceiver 14 provided outside the turbine casing 8 is connected. The glass fiber probe 12 is led, within the turbine casing 8, through a tube 17 insulated by ceramic 16. A measurement reference point 18 being formed of nonoxidizing material is applied to a surface of a free end of the moving blade 6 or each moving blade 6. The material of the measurement reference point 18 is formed, for example, of chrome-nickel, platinum or gold. These materials are distinguished by being resistant to scaling. An evaluation and diagnostic system 20 is connected to the light wave transceiver 14. The evaluation and diagnostic system 20 evaluates changes in light conditions at a measuring location 21 and calculates a radial gap 22 occurring between the moving blades 6 and the turbine casing 8.

Figure 2:
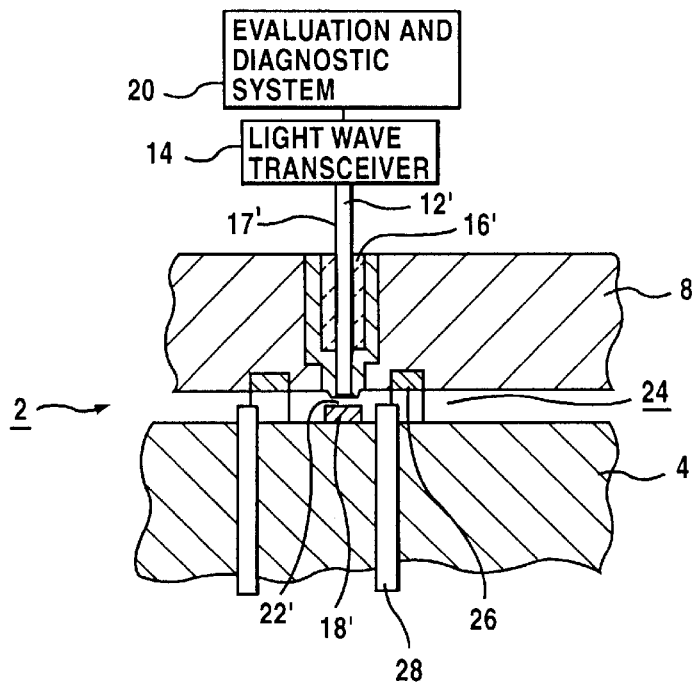

FIG. 2 shows the turbine 2 in the region of a labyrinth seal 24 which is disposed between the turbine shaft 4 and the turbine casing 8. The labyrinth seal 24 is inserted through the turbine casing 8 in order to seal off a shaft leadthrough. In this case, the labyrinth seal 24 includes sealing tapes 26 in the turbine casing 8 and grooves 28 in the turbine shaft 4. Once again, in order to measure a radial gap 22' between the turbine casing 8 and the turbine shaft 4, a measurement reference point 18' being formed of nonoxidizing material is disposed on a shaft surface of the turbine shaft 4 in a region between the grooves 28. A glass fiber probe 12' is likewise led, within the turbine casing 8, through a tube 17' which is insulated by a ceramic 16'. The probe is once again connected through a light wave transceiver 14 to the evaluation and diagnostic system 20.

Figure 3:
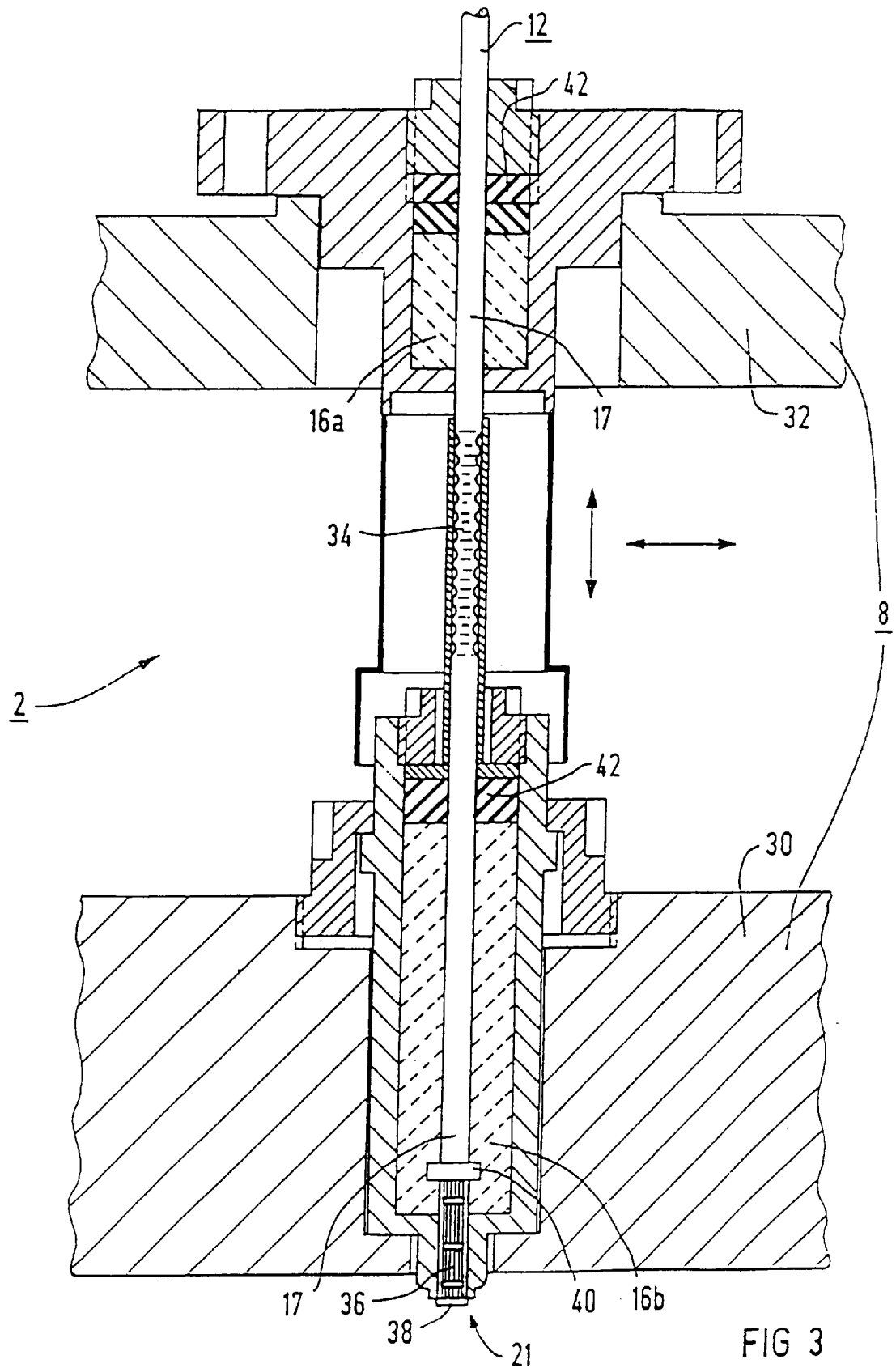
FIG. 3 is an enlarged, fragmentary, sectional view of a portion III of FIG. 1, with a glass fiber probe led through an inner casing and an outer casing.

FIG. 3 shows the turbine casing 8 of the turbine 2 according to FIG. 1 with an inner casing 30 and an outer casing 32. In this case, the glass fiber probe 12 is led, in a region between the inner casing 30 and the outer casing 32, through an elastic jacket 34 for the purpose of compensating for operational expansions. The tube 17 is insulated by ceramic 16a, 16b both in the region of the inner casing 30 and in the region of the outer casing 32 as a protection against high temperature. The glass fiber probe 12, which is inserted into the tube 17, is composed of bundled glass fibers 36. In order to protect the glass fiber probe 12 against moisture and heat, quartz glass 38, for example a sapphire window, is disposed at the measuring location 21. The glass fiber probe 12 is releasably connected to the inserted tube 17 in the inner casing 30 by a thread 40. Thus, when the turbine 2 is shut down, the glass fiber probe 12 can be removed through the outer casing 32, without the turbine 2 being uncovered. In order to compensate for operationally induced relative movements between the inner casing 30 and the outer casing 32, soft seals 42 are provided over some of the length of the tube 17, both in the inner casing 30 and in the outer casing 32.

Operational stress on a rotor 5, composed of the turbine shaft 4 and the moving blades 6, leads to the radial gaps 22, 22' between the turbine casing 8 and the free end of the moving blades 6 or the turbine shaft 4. Radial gaps 22, 22' of this kind are determined, on the basis of differences in light intensity and by comparing these with a reference value. This is done through the use of the glass fiber probes 12, 12' and through the use of the nonoxidizing measurement reference points 18, 18' disposed on the moving blades 6 and/or on the shaft surface of the turbine shaft 4.

The reference value is determined during a calibrating operation when the turbine 2 is shut down. For this purpose, the intensities of the light transmitted by the light wave transceiver 14, reflected by the measurement reference point 18 and received again by the light wave transceiver 14 are compared with one another. The radial gap 22 and/or 22' is calculated from the result of this comparison in the evaluation and diagnostic system 20.

When the turbine 2 is in operation, the currently recorded differences in intensity are compared with the differences in intensity which are determined during reference measurement. The change and/or size of the radial gap 22, 22' is calculated from a deviation of the difference in intensity of the current measurement from that of the reference measurement, in the evaluation and diagnostic system 20.

I claim:

1. In a turbine configuration including a turbine shaft having a surface, turbine blades fastened to the turbine shaft and having surfaces, and a turbine casing surrounding the turbine blades, a device for recording a change in position at the turbine configuration, comprising:

a glass fiber probe led through the turbine casing;

a measurement reference point applied to at least one of said surfaces of the turbine blades and formed of nonoxidizing material for reflecting light from said glass fiber probe;

a recorder recording intensity of the reflected light from said measurement reference point; and a comparator comparing the recorded intensity of the reflected light with a reference intensity value determined at a previous time.

2. The device according to claim 1, wherein said nonoxidizing material of said measurement reference point is resistant to scaling.

3. The device according to claim 1, wherein said glass fiber probe is composed of a glass fiber bundle.

4. The device according to claim 1, wherein said glass fiber probe is releasably inserted into the turbine casing.

5. The device according to claim 1, including a tube insulated by ceramic, said glass fiber probe inserted into said tube.

6. The device according to claim 1, wherein the turbine casing has two turbine casing parts defining a region therebetween, and said glass fiber probe is led through an elastic jacket in said region.

7. The device according to claim 1, including a light wave transceiver connected to said glass fiber probe.

8. The device according to claim 1, including a labyrinth seal between the turbine shaft and the turbine casing, said at least one measurement reference point applied to the surface of the shaft in the vicinity of said labyrinth seal.

9. The device according to claim 1, including a labyrinth seal between the turbine shaft and the turbine casing, and at least one other measurement reference point, at least one of said measurement reference point and said at least one other measurement reference point applied to the surface of the shaft in the vicinity of said labyrinth seal.

10. The device according to claim 1, including at least one other glass fiber probe and at least one other measurement reference point, a plurality of said glass fiber probes and a corresponding number of said measurement reference points disposed on at least one of the surfaces for measuring shaft displacement.

11. The device according to claim 1, including an evaluation and diagnostic system for determining and representing a radial gap profile and shaft displacement.

12. In a turbine configuration including a turbine shaft having a surface, turbine blades fastened to the turbine shaft and having surfaces, and a turbine casing surrounding the turbine blades, a device for recording a change in position at the turbine configuration, comprising:

a glass fiber probe led through the turbine casing;

a measurement reference point applied to at least one of said surfaces of the turbine blades and formed of nonoxidizing material for reflecting light from said glass fiber probe;

means for recording intensity of the reflected light from said measurement reference point; and means for comparing the recorded intensity of the reflected light with a reference intensity value determined at a previous time.

* * * * *